US006865928B2

United States Patent
Yanase et al.

(10) Patent No.: US 6,865,928 B2
(45) Date of Patent: Mar. 15, 2005

(54) CONSTRUCTION FOR END PORTION OF LINE OF VEHICLE WHICH OPENS TO ATMOSPHERE

(75) Inventors: Taiki Yanase, Saitama (JP); Masaaki Horiuchi, Saitama (JP); Kouichirou Toyota, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 134 days.

(21) Appl. No.: 10/180,310

(22) Filed: Jun. 27, 2002

(65) Prior Publication Data

US 2003/0000294 A1 Jan. 2, 2003

(30) Foreign Application Priority Data

Jun. 29, 2001 (JP) ..................................... P. 2001-197782

(51) Int. Cl.[7] ............................................. G01M 15/00
(52) U.S. Cl. ..................................................... 73/118.1
(58) Field of Search .................... 73/40, 23.31, 40.5 R, 73/49.2, 49.7, 61.41, 118.1, 118.2, 862.49

(56) References Cited

U.S. PATENT DOCUMENTS

| | | | |
|---|---|---|---|
| 4,611,551 A | 9/1986 | Ferguson et al. | 114/339 |
| 4,805,610 A | 2/1989 | Hunt | 128/201.11 |
| 5,199,422 A | 4/1993 | Rasocha | 128/201.11 |
| 5,942,691 A | 8/1999 | Hopkins et al. | 73/706 |
| 6,155,212 A | * 12/2000 | McAlister | 123/3 |
| 6,382,196 B2 | * 5/2002 | Kawamoto et al. | 123/580 |

* cited by examiner

Primary Examiner—Kamand Cuneo
Assistant Examiner—Monica D. Harrison
(74) Attorney, Agent, or Firm—Armstrong, Kratz, Quintos, Hanson & Brooks, LLP

(57) ABSTRACT

A waterproofing member accommodated in the interior of a vehicle body frame having a closed cross section is constructed such that an upper end portion of a tube portion is covered with an inverted cup-like lid which opens on a bottom side thereof and that the height Hc of an opening below the bottom side of the lid is set lower than the height Hp of an end portion of the tube portion. Accordingly, even if the end portion of the tube portion and the lid are submerged, air captured within the lid can prevent the rise of the level of water to prevent the penetration of water into the tube portion.

14 Claims, 9 Drawing Sheets

CONSTRUCTION FOR END PORTION OF LINE OF VEHICLE WHICH OPENS TO ATMOSPHERE

BACKGROUND OF THE INVENTION

1. Field of the Invention

The present invention relates to a construction for an end portion of a line of a vehicle which opens to the atmosphere. In particular, the present invention relates to a line of a vehicle for introducing the atmospheric pressure to a pressure sensor for detection of a differential pressure from, for example, the atmospheric pressure, and more particularly to a construction for preventing the penetration of water into the line.

2. Description of the Related Art

In the event that an end portion of a line of a vehicle for introducing atmospheric pressure into a pressure sensor opens upwardly, there is caused a risk that water penetrates into the end portion from above to thereby damage the function of the pressure sensor. Accordingly, a labyrinth has been provided at the end portion of the line of the vehicle to prevent the penetration of water into the line, or the end portion of the line has been made to open at a higher position where the end portion is difficult to be subjected to water to thereby prevent the penetration of water into the line.

However, even if the above labyrinth construction is adopted, in the event that the end portion of the line of the vehicle is submerged, it is not possible to prevent the penetration of water into the line.

On the other hand, in the event that the end portion of the line is placed at a higher position, there is caused a problem that the degree of freedom in designing the layout of the line is damaged.

SUMMARY OF THE INVENTION

The present invention was made in view of the above-described situations, and an object thereof is to ensure the prevention of penetration of water into a line of a vehicle with a simple construction even if an end portion of the line is submerged.

With a view to attaining this object, according to a first aspect of the invention, there is provided a construction for an end portion of a line of a vehicle which opens to the atmosphere wherein an end portion of a line is covered with an inverted cup-like lid which has an opening that opens on a bottom side thereof, and wherein the height of the opening at the bottom side of the lid is set lower than the height of the end portion of the line.

According to the above construction, because the inverted cup-like lid for covering the end portion of the line is constructed such that the height of the opening at the bottom side thereof is made to be lower than the height of the end portion of the line, even if the end portion of the line and the lid are submerged, air captured within the lid prevents the rise of the level of water to thereby prevent the penetration of water into the line.

According to a second aspect of the present invention, there is provided a construction for an end portion of a line of a vehicle which opens to the atmosphere as set forth in the first aspect of the present invention, wherein the line is an atmospheric pressure introducing line of a pressure sensor for detecting a differential pressure between the atmospheric pressure and an internal pressure of a fuel vapor processing system.

According to the above construction, because the line is the atmospheric pressure introducing line of the pressure sensor for detecting a differential pressure between the atmosphere and the internal pressure of the fuel vapor processing system, the penetration of water into the pressure sensor via the line can be securely prevented.

According to a third aspect of the invention, there is provided a construction for an end portion of a line of a vehicle which opens to the atmosphere as set forth in the second aspect of the invention, wherein the lid and the end portion of the line are disposed in the interior of a member having a closed cross section at a lower portion of a vehicle body.

According to the above construction, because the lid and the end portion of the line are disposed in the interior of the member having the closed cross section at the lower portion of the vehicle body, not only can the penetration of water be prevented more securely but also the penetration of dust into the line can be prevented.

Note that a vehicle body frame 29 in the embodiments described below has a closed cross section, and a tube portion 31, 51 in the embodiments is the line.

DETAILED DESCRIPTION OF THE PREFERRED EMBODIMENTS

Preferred embodiments according to the present invention will be described below based on embodiments of the invention illustrated in the accompanying drawings.

Figure 1:
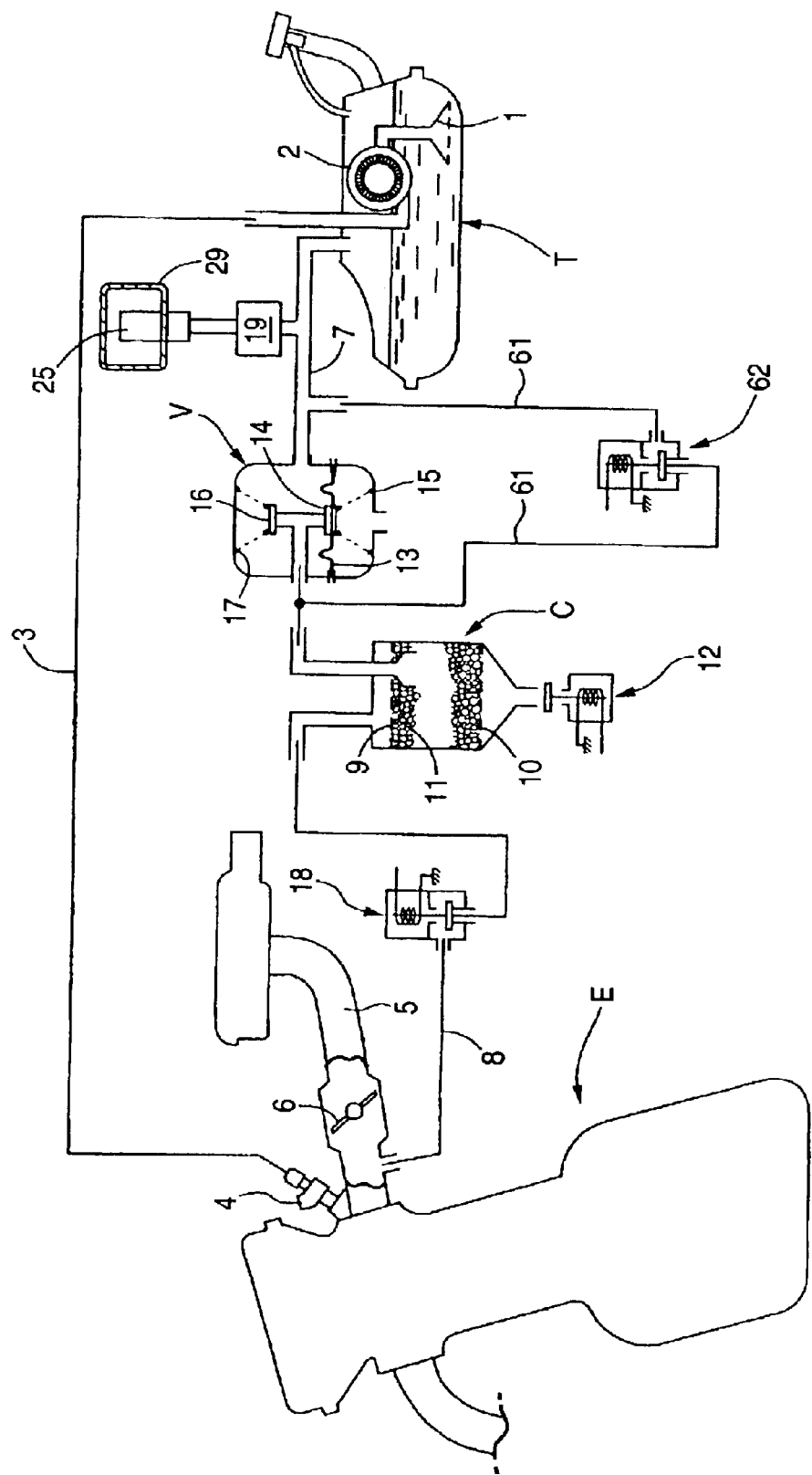
FIG. 1 is a view showing the overall construction of a fuel vapor processing system for an engine according to a first embodiment.
Figure 2:
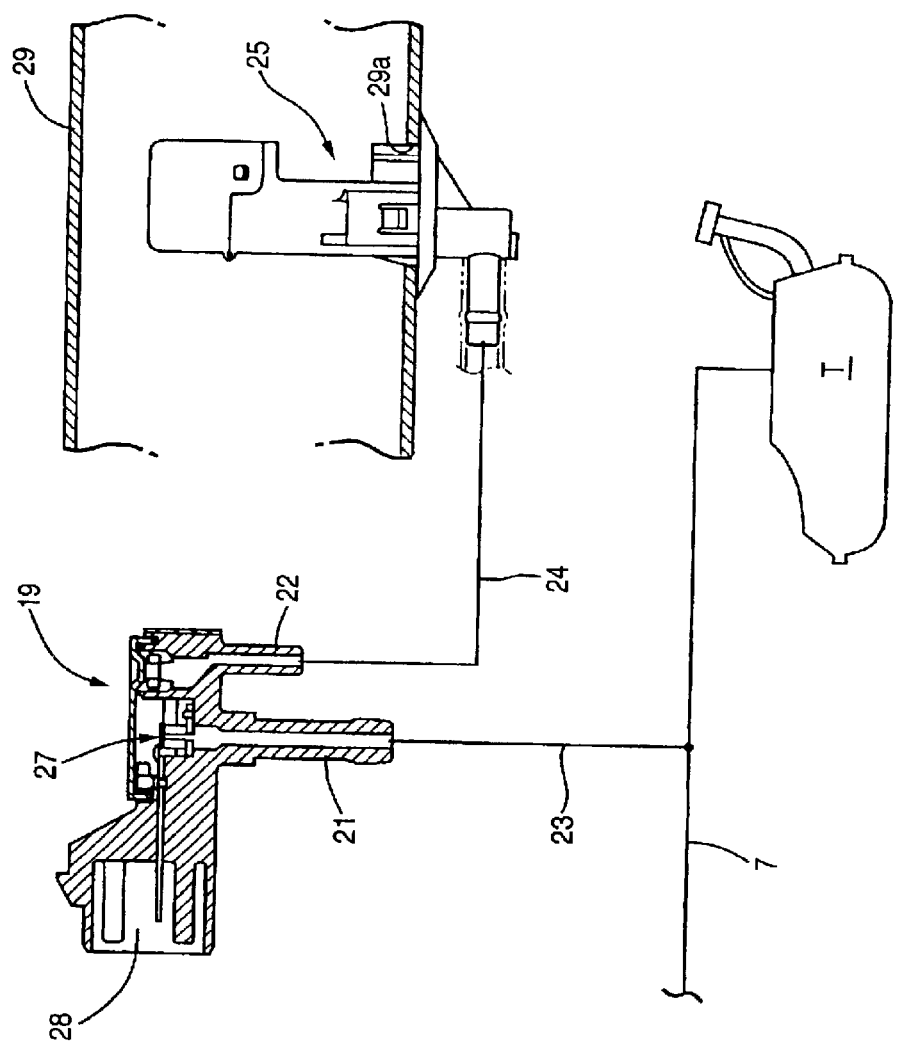
FIG. 2 is an enlarged view showing a main part of FIG. 1.
Figure 3:
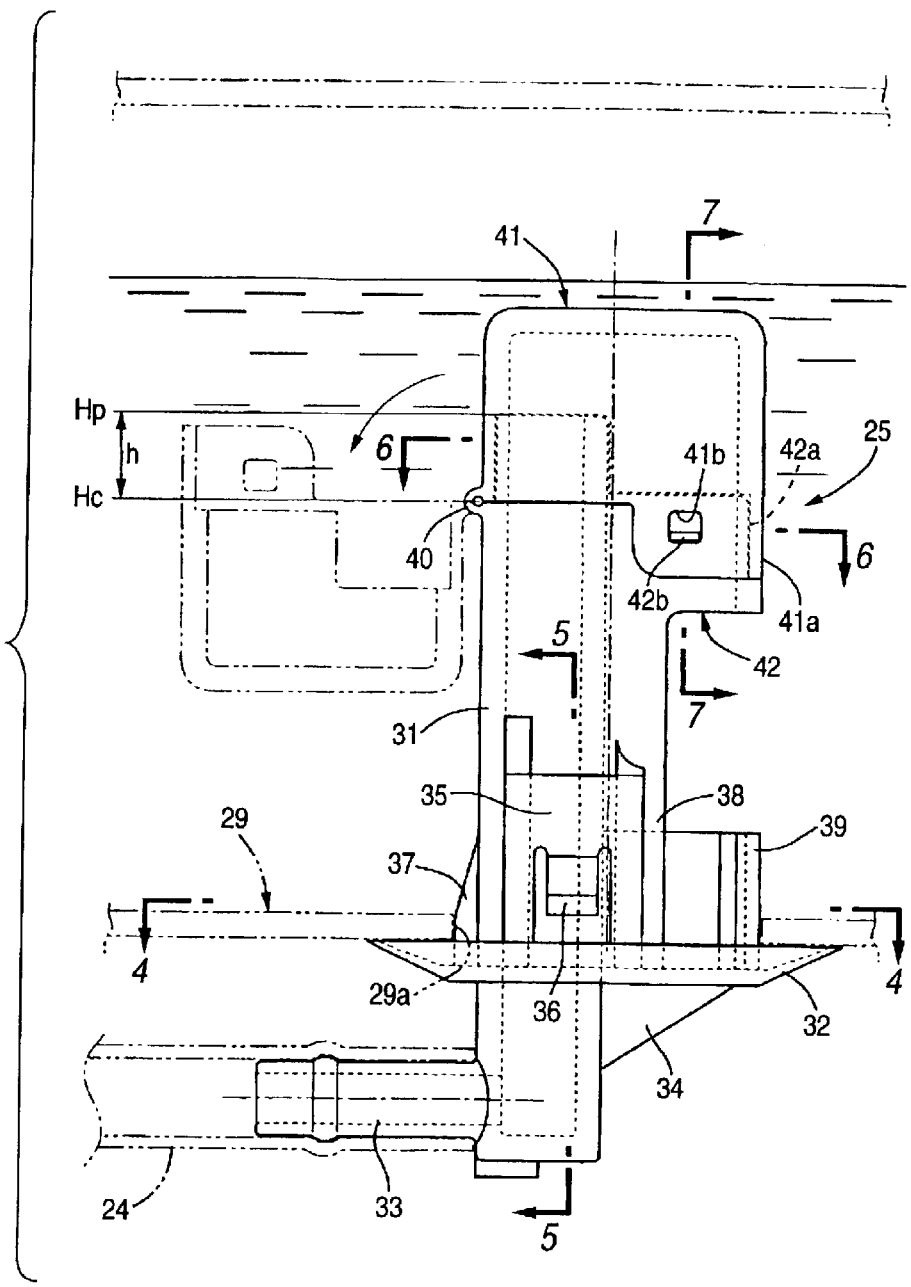
FIG. 3 is a side view of a waterproofing member according to the first embodiment.
Figure 4:
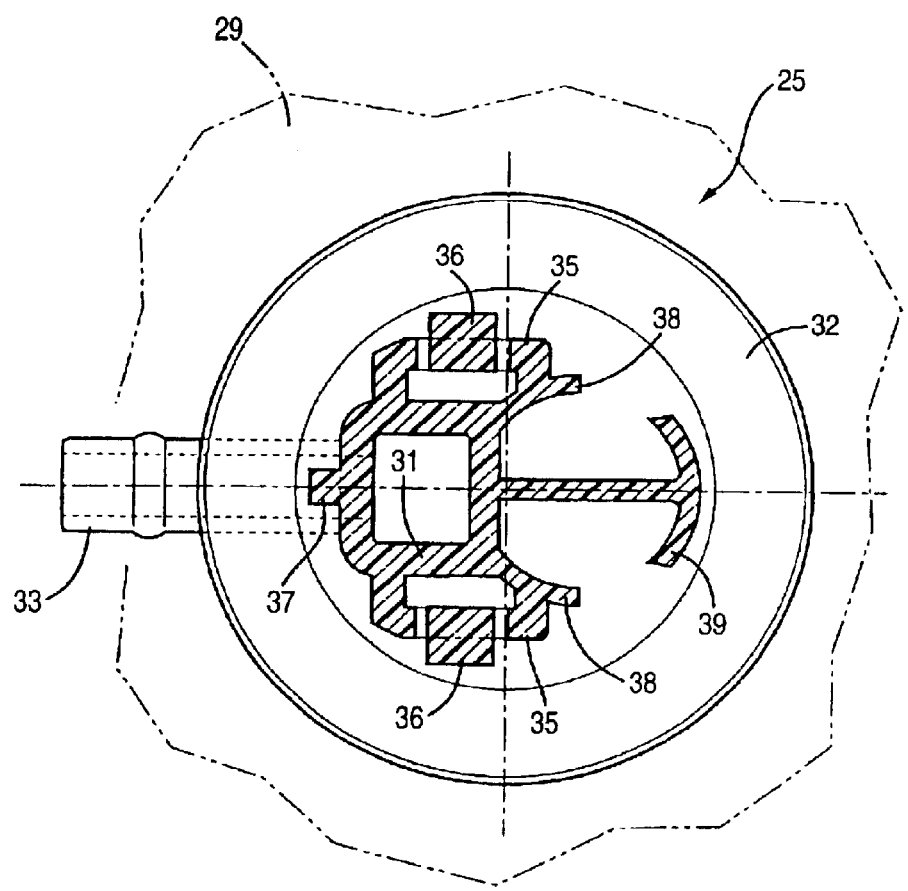
FIG. 4 is a horizontal cross-sectional view taken along the line 4—4 in FIG. 3.
Figure 5:
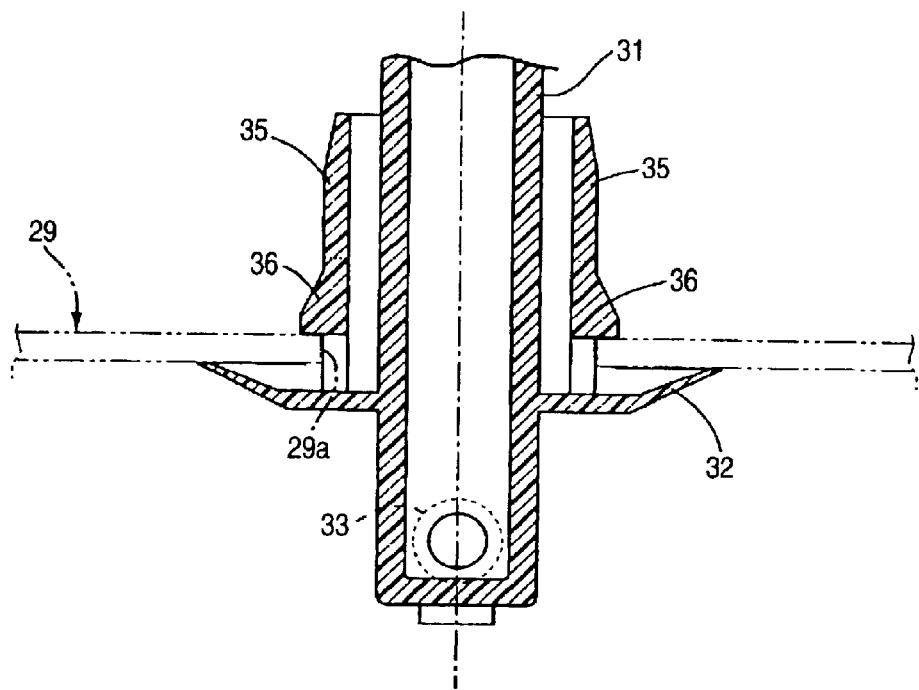
FIG. 5 is a vertical cross-sectional view taken along the line 5—5 in FIG. 3.
Figure 6:
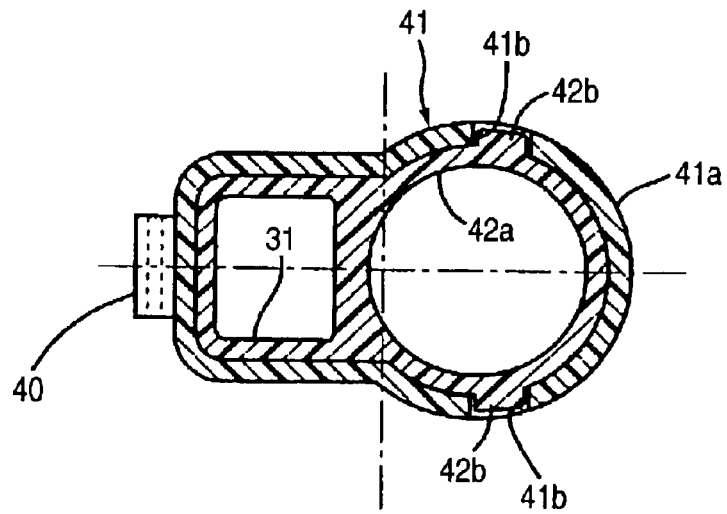
FIG. 6 is a horizontal cross-sectional view taken along the line 6—6 in FIG. 3.
Figure 7:
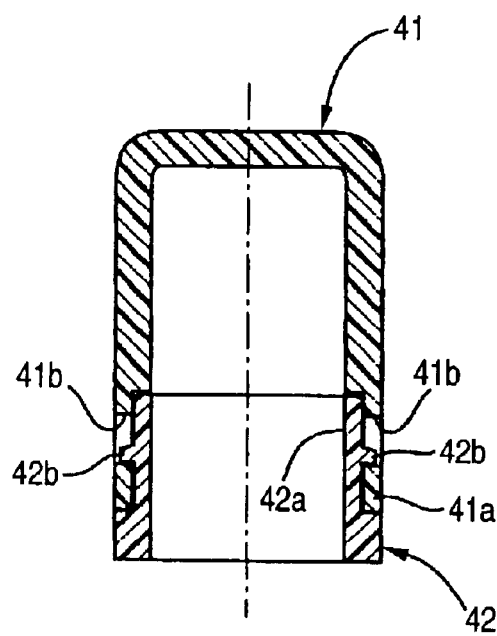
FIG. 7 is a vertical cross-sectional view taken along the line 7—7 in FIG. 3.

FIGS. 1 to 7 show a first embodiment of the invention, in which FIG. 1 is a view showing the overall construction of a fuel vapor processing system for an engine, FIG. 2 is an enlarged view of a main part in FIG. 1, FIG. 3 is a side view of a waterproofing member, FIG. 4 is a horizontal cross-sectional view taken along the line 4—4 in FIG. 3, FIG. 5 is a vertical cross-sectional view taken along the line 5—5 in FIG. 3, FIG. 6 is a horizontal cross-sectional view taken along the line 6—6 in FIG. 3, and FIG. 7 is a vertical cross-sectional view taken along the line 7—7 in FIG. 3.

As shown in FIG. 1, fuel picked up from a fuel tank T via a filter 1 and a fuel pump 2 is supplied to a fuel injection valve 4 of an engine E via a feed tube 3. An upper space in the fuel tank T is connected to a downstream position of a throttle valve 6 provided along an air inlet duct 5 via a charge tube 7 and a purge tube 8, and a canister C which can be charged with and purged of fuel vapors is disposed between the charge tube 7 and the purge tube 8.

The canister C is constructed such that charcoal 11 acting as an adsorbent is contained between upper and lower filters 9, 10, and the charge tube 7 on the fuel tank T side opens to the interior of the charcoal 11 while the purge tube 8 on the engine E side opens to an upper space above the upper filter 9 with a lower space below the lower filter 10 opening to the atmosphere via a vent-shut valve 12.

A two-way type valve V is disposed along the charge tube 7 connecting the fuel tank T with the canister C. In the two-way type valve V, in the event that the internal pressure of the fuel tank T rises to exceed the atmospheric pressure by a predetermined value, a positive pressure one-way type valve 14 supported by a diaphragm 13 opens against the spring force of a spring 15 to thereby allow the fuel tank T to communicate with the canister C. In contrast, in the event that the internal pressure of the fuel tank T lowers to exceed the internal pressure of the canister C by a predetermined value, a negative pressure one-way type valve 16 opens against the spring force of a spring 17 to thereby allow the canister C to communicate with the fuel tank T. In addition, as will be described later, when purging the canister C, there may occur a case where a negative pressure is provided on the canister C side, and as this occurs, both the positive pressure one-way type valve 14 and the negative pressure one-way type valve 16 of the two-way type valve V are maintained in a closed condition.

A bypass valve 62 comprising an electromagnetic valve is provided at an intermediate portion along the length of a bypass tube 61 which branches off the charge tube 7 on both sides of the two-way type valve V. When the bypass valve 62 opens a direct communication is provided through the charge tube 7 on the both sides of the two-way type valve V, which then substantially becomes out of function.

A purge control valve 18 comprising an electromagnetic valve is provided along the purge tube 8 which connects the canister C with the air inlet duct 5 of the engine E. When the purge control valve 18 opens a communication is established between the canister C and the air inlet duct 5, whereas when the purge control valve 18 closes the communication between the canister C and the air inlet duct 5 is cut off. A pressure sensor 19 for detecting a differential pressure between the atmospheric pressure and the internal pressure of the fuel tank T is provided along the charge tube 7 at a position closer to the fuel tank T than the two-way type valve V.

As shown in FIG. 2, the pressure sensor 19 comprises a joint 21 communicating with the fuel tank T and ajoint 22 communicating with the atmosphere, and the fuel tank communicating joint 21 communicates with the fuel tank T via a primary pressure detecting tube 23 and the charge line 7 whereas the atmosphere communicating joint 22 communicates with the atmosphere via a secondary pressure detecting tube 24 and a waterproofing member 25. The pressure sensor 19 comprises a sensor chip 27 for converting a differential pressure between the fuel tank communicating joint 21 and the atmosphere communicating joint 22 into a voltage, and the sensor chip 27 is then connected to an electronic control unit via a connector 28.

As shown in FIGS. 3 to 7, the waterproofing member 25 is a unitary part formed of a synthetic resin and most of the waterproofing member 25 is accommodated in the interior of a vehicle body frame 29 (for example, a rear cross beam) which has a closed cross section over most portions thereof. This vehicle body frame 29 is provided on a bottom side of the vehicle body at a position which is easily submerged. The waterproofing member 25 comprises a tube portion 31 which is closed at a lower end while opened at an upper end thereof and which has a quadrangular cross section. In addition, provided on the tube portion 31 at an intermediate position which is slightly closer to the lower end is a flange 32 adapted to be brought into abutment with the bottom side of the vehicle body 29, and provided below the flange 32 are a joint 33 continuously connecting to the secondary pressure detecting tube 24 and a reinforcement rib 34. Provided on a portion of the tube portion 31 which continuously extends above the flange 32 are expanded portions 35, 35, locking projections 36, 36 which protrudes from the surfaces of the expanded portions 35, 35 and four reinforcement ribs 37, 38, 38, 39.

A lid 41, which is provided so as to be integrated into the upper end of the tube portion 31 via a thin hinge portion 40, is an inverted cup-like member which is closed on an upper side while opened on a lower side thereof. A thin partially arc-like overlapping portion 41a is formed partially along a lower edge of the lid 41, and two locking holes 41b, 41b are formed in the overlapping portion 41a in such a manner as to penetrate therethrough. An annular atmosphere communicating portion 42 is provided integrally at upper ends of the reinforcement ribs 38, 38 which extend upwardly along the tube portion 31, and a thin overlapping portion 42a is formed above the atmosphere communicating portion 42. As shown in FIG. 6, the overlapping portion 42a is adapted to fittingly engaged with an inner circumference of the overlapping portion 41a of the lid 41 and comprises locking projections 42b, 42b which are adapted to be brought into engagement with the locking holes 41b, 41b in the overlapping portion 41a of the lid 41.

Consequently, when inserting the waterproofing member 25 through an opening 29a formed in the bottom side of the vehicle body frame 29 with the lid 41 being oriented upwardly the locking projections 36, 36 elastically deform and pass through the opening 29a, whereby the circumferential edge of the opening 29a in the vehicle body frame 29 is held between the locking projections 36, 36 and the flange 32 vertically so that the waterproofing member 25 is fixed to the vehicle body frame 29. Then, the secondary pressure detecting tube 24 is connected to the joint 33 of the waterproofing member 25 which is exposed to the outside of the vehicle body frame 29.

Next, the function of the first embodiment which is constructed as has been described heretofore will be described.

While the engine E remains off, the purge control valve 18 is held in the closed condition. When the temperature in the fuel tank T rises in this condition and the internal pressure in the fuel tank T is increased by the evaporation of fuel, the positive pressure one-way type valve 14 of the two-way type valve V opens. Accordingly, fuel vapors and air in the fuel tank T are allowed to flow into the canister C via the charge line 7. In the canister C, the fuel vapors are adsorbed by the charcoal 11 to prevent the leakage of fuel vapors to the outside.

When the engine E comes to operate stably after a predetermined length of time has elapsed since the start of the engine E, the purge control valve 18 provided along the purge line 8 is activated to open to thereby establish a communication between the canister C and the air inlet duct 5 of the engine E. Accordingly, a negative pressure generated in the air inlet duct 5 is transmitted to the canister C and the vent-shut valve 12. As a result, air is introduced into the canister C from the vent-shut valve 12, and the canister C is purged of fuel vapors which are adsorbed by the charcoal 11 in the canister C, and the fuel vapors are fed to the air inlet duct 5 together with the air.

When a negative pressure is generated within the internal space of the fuel tank T due to a decrease in the temperature inside the fuel tank T. the negative pressure one-way type valve 16 of the two-way type valve V opens. Air drawn through the vent-shut valve 12 is then supplied to the fuel tank T through the canister C and the charge tube 7 to thereby prevent the deformation of the fuel tank T due to an excessive negative pressure.

In order to test the fuel vapor processing system including the fuel tank T for generation of a leakage failure, in FIG. 1, the purge control valve 18 and the bypass valve 62 are activated to open with the vent-shut valve 12 of the canister C being left closed, so that an inlet negative pressure in the air inlet duct 5 of the engine E is allowed to act on the purge tube 8, the canister C, the charge tube 7 and the fuel tank T. As this occurs, because the bypass valve 62 remains open, the negative pressure can be made to act directly on the fuel tank T by bypassing the two-way type valve V. Then, after closing the purge control valve 18 in this condition, the internal pressure of the fuel vapor processing system is monitored by the pressure sensor 19. Namely, because the internal pressure of the fuel vapor processing system (in other words, the fuel tank T) acts on the fuel tank communicating joint 21 of the pressure sensor 19 via the primary pressure detecting tube 23, whereas the internal pressure of the vehicle body frame 29 (in other words, the atmospheric pressure) acts on the atmosphere communicating joint 22 via the secondary pressure detecting tube 24 and the waterproofing member, the pressure sensor 19 detects a differential pressure between the atmospheric pressure and the internal pressure of the fuel vapor processing system. Consequently, in the event that a leakage failure occurs along the fuel vapor processing system, the differential pressure would decrease gradually in association with the elapse of time since the purge control valve 18 was closed. However, with no leakage failure the differential pressure should be maintained constant.

As is clear from FIG. 3, because a highest position Hc of an opening below a bottom face of the lid 41 of the waterproofing member 25 is disposed at a position lower than the height HP of the opening at the upper end of the tube portion 31 by a distance h, even if water enters the interior of the vehicle body frame 29 and the waterproofing member 25 is submerged, whereby a slight water pressure is applied, the level of water inside the lid 41 only has to be slightly higher than the height Hc at the upper end of the opening below the bottom face of the lid 41, and there occurs no case where the level of water reaches the height Hc of the opening at the upper end of the tube portion 31. Thus, the penetration of water in the vehicle body frame 29 into the pressure sensor 19 via the waterproofing member 25 and the secondary pressure detecting tube 24 can securely be prevented. Moreover, the placement of the waterproofing member 25 within the vehicle body frame 29 can also prevent the penetration of dust into the pressure sensor 19 via the waterproofing member 25.

Servicing the waterproofing member 25 can be easily implemented by drawing the entirety of the waterproofing member 25 out of the opening 29a in the vehicle body frame 29 and releasing the engagement between the locking projections 42b, 42b and the locking holes 41b, 41b to thereby release the lid 41 so as to be positioned at a location illustrated by chain lines in FIG. 3.

Figure 8:
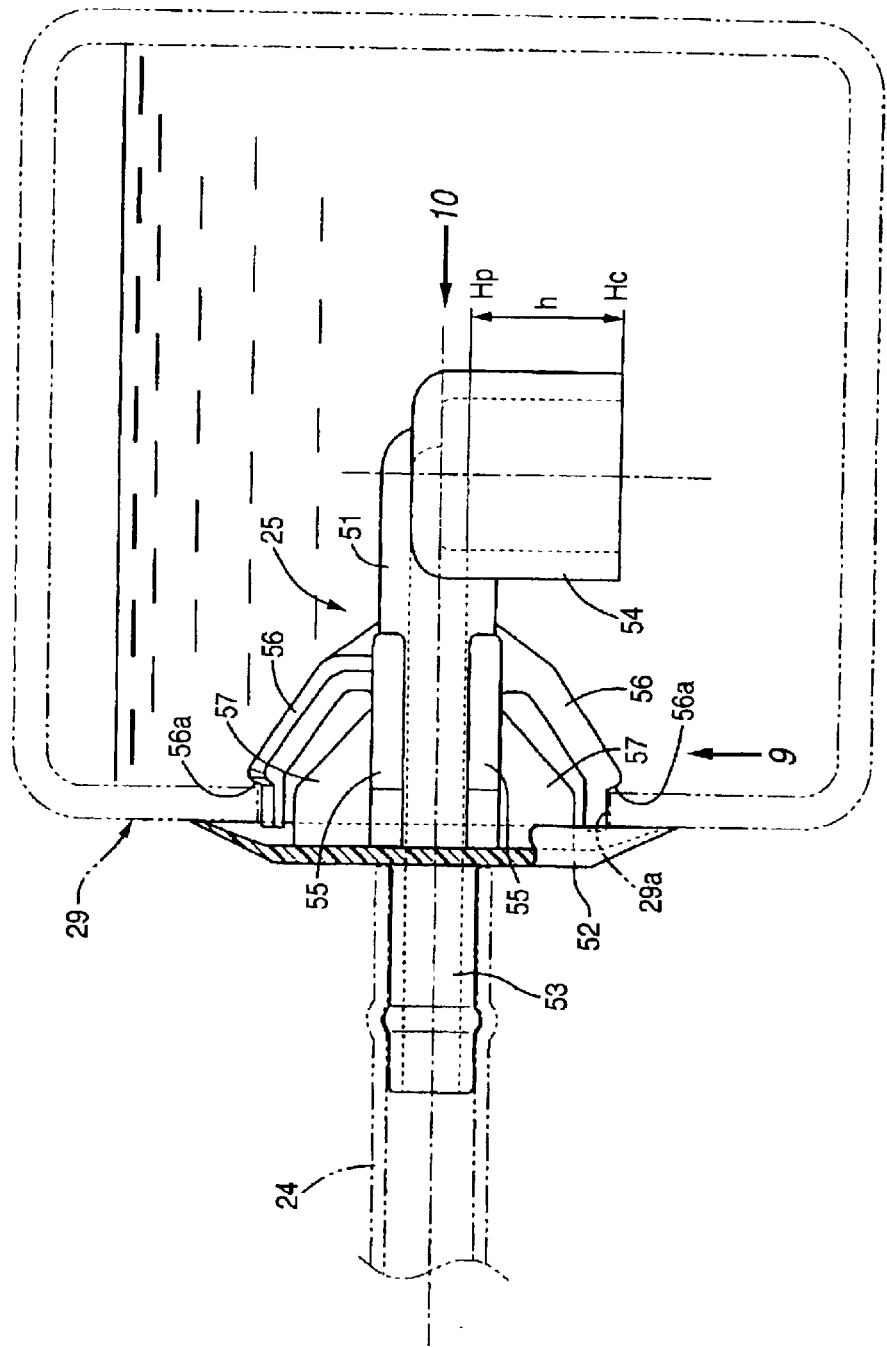
FIG. 8 is side view of a waterproofing member according to a second embodiment.
Figure 9:
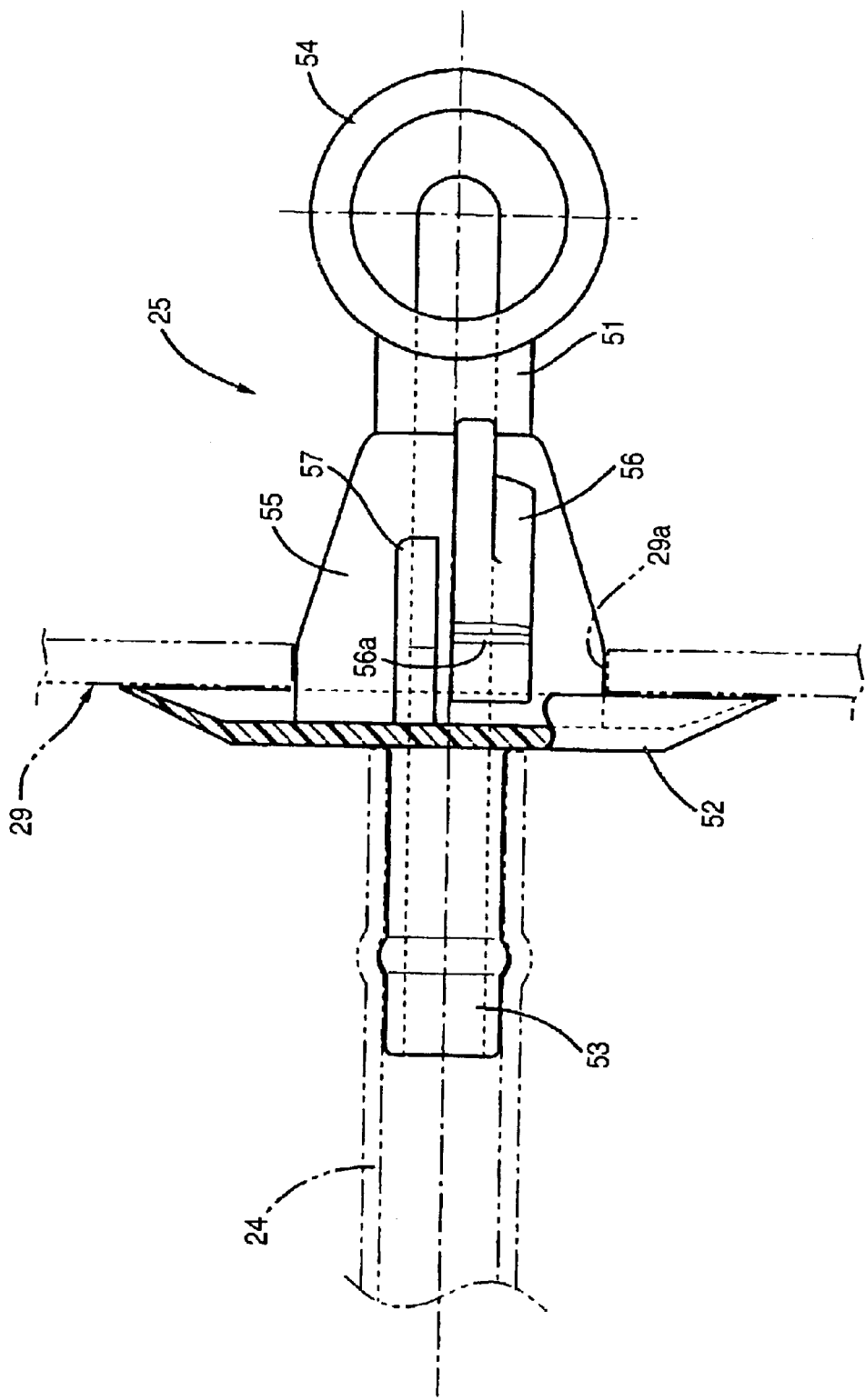
FIG. 9 is a view as seen in a direction indicated by an arrow denoted by reference numeral 9 in FIG. 8.
Figure 10:
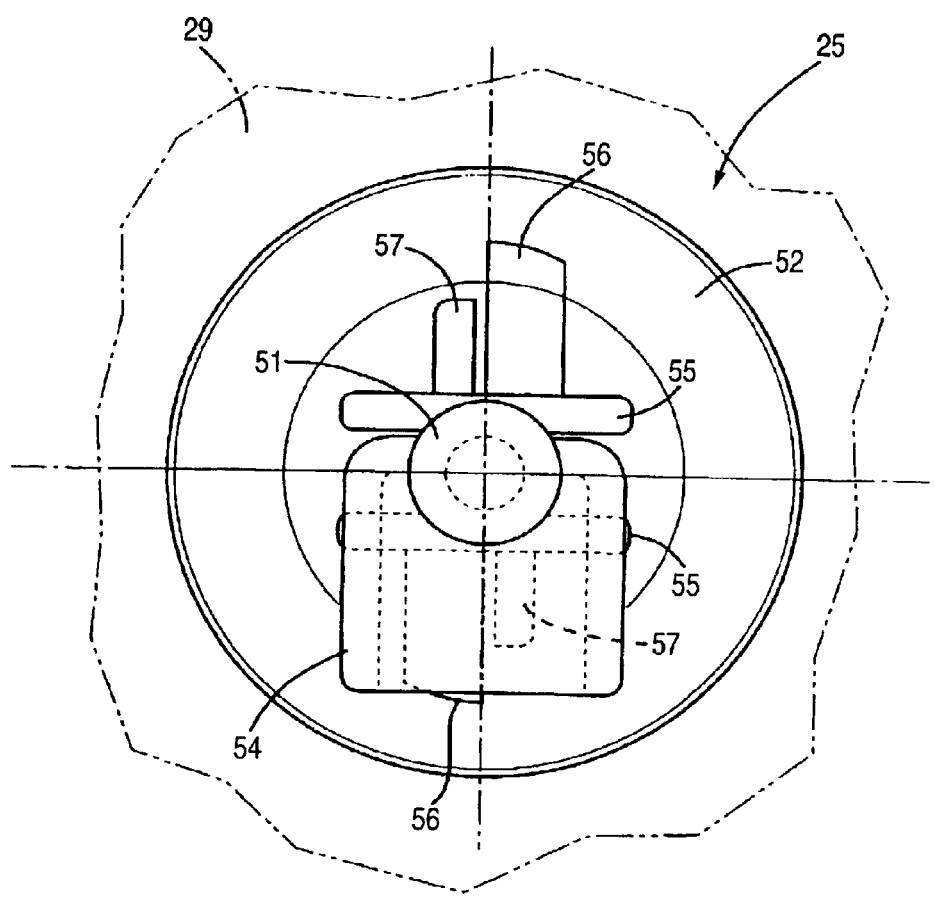
FIG. 10 is a view as seen in a direction indicated by an arrow denoted by reference numeral 10 in FIG. 8.

Next, a second embodiment of the present invention will be described based on FIGS. 8 to 10.

A waterproofing member 25 according to the second embodiment of the invention is adapted to be inserted through an opening 29a formed in a side of a vehicle body frame 29 and comprises a tube portion 51 extending in a horizontal direction, a joint 53 provided to continuously connect to one end of the tube portion 51 via a flange 52, an inverted cup-like lid 54 provided to continuously connect to the other end of the tube portion 51 so in such a manner to open downwardly, upper and lower plate-like portions 55, 55, two locking pawls 56, 56 provided on upper and lower faces of the plate-like portions 55, 55, respectively, and reinforcement ribs 57, 57.

Consequently, when inserting the waterproofing member 25 through the opening 29a formed in the side of the vehicle body frame 29, the locking pawls 56, 56 elastically deform and stepped portions 56a, 56a pass through the opening 29a, whereby the circumferential edge of the opening 29a in the vehicle body frame 29 is held between the locking pawls 56, 56 and a flange 52 from the left and right so that the waterproofing member 25 is fixed to the vehicle body frame 29. Then, the secondary pressure detecting tube 24 is connected to a joint 53 of the waterproofing member 25 which is exposed to the outside.

As is clear from FIG. 8, since a highest position Hc of an opening below a bottom face of the lid 54 of the waterproofing member 25 is disposed at a position lower than a lowest position Hp of an opening in the tube portion 51 by a distance h, even if water enters the interior of the vehicle body frame 29 and the waterproofing member 25 is submerged, whereby a slight water pressure is applied, the level of water inside the lid 54 only has to be slightly higher than the height Hc at the upper end of the opening below the bottom face of the lid 54, and there occurs no case where the level of water reaches the height Hp of the opening of the tube portion 51. Thus, the penetration of water in the vehicle body frame 29 into the pressure sensor 19 via the waterproofing member 25 and the secondary pressure detecting tube 24 can securely be prevented.

Thus, while the embodiments of the invention have been described in detail heretofore, the design of the invention may be modified variously without departing from the spirit and scope of the invention.

For example, the configurations of the tube portions 31, 51 and the lids 41, 54 of the waterproofing member 25 are not limited to those of the embodiments but may be modified appropriately.

In addition, while the line of the vehicle which continuously connect to the pressure sensor 19 has been illustrated in the embodiments, the invention may be applied to any other lines of the vehicle that are used for other purposes.

Thus, according to the first aspect of the invention, since the inverted cup-like lid for covering the end portion of the line is constructed such that the height of the opening below the bottom face thereof is made to be lower than the height of the end portion of the line, even if the end portion of the line and the lid are submerged, air captured within the lid prevents the rise of the level of water to thereby prevent the penetration of water into the line.

In addition, according to the second aspect of the invention, since the line is the atmospheric pressure introducing line of the pressure sensor for detecting a differential pressure between the atmosphere and the internal pressure of the fuel vapor processing system, the penetration of water into the pressure sensor via the line can be securely prevented.

Furthermore, according to the third aspect of the invention, since the lid and the end portion of the line are disposed in the interior of the member having the closed cross section at the lower portion of the vehicle body, not only can the penetration of water be prevented more securely but also the penetration of dust into the line can be prevented.

What is claimed is:

1. A construction for an end portion of a line of a vehicle which opens to the atmosphere, comprising:
   an inverted cup-like lid which covers the end portion of the line and having an opening that opens downward on a bottom side thereof to the atmosphere,
   wherein the height of the opening of said lid is set lower than the height of said end portion of said line.

2. The construction as set forth in claim 1, wherein said line is an atmospheric pressure introducing line of a pressure sensor for detecting a differential pressure relative to the atmospheric pressure.

3. The construction as set forth in claim 2, wherein the pressure sensor detects a differential pressure between the atmospheric pressure and an internal pressure of a fuel vapor processing system.

4. The construction as set forth in claim 1, wherein said lid and said end portion of said line are disposed in the interior of a member having a closed cross section at a lower portion of a vehicle body.

5. The construction as set forth in claim 2, wherein said fuel vapor processing system comprises a fuel tank.

6. The construction as set forth in claim 3, wherein said fuel vapor processing system comprises a fuel tank.

7. The construction as set forth in claim 4, wherein said member having the closed cross section is a vehicle body frame.

8. The construction as set forth in claim 1, wherein said end portion comprises a tube member that includes a mounting structure relative to said vehicle.

9. The construction as set forth in claim 8, wherein said mounting structure comprises a locking projection and a flange between which a part of vehicle body frame is clamped.

10. The construction as set forth in claim 8, wherein said tube member comprises an engaging member, and said lid comprises an engaged member that is engaged with said engaging member.

11. The construction as set forth in claim 8, wherein said tube member extends in a vertical or horizontal direction.

12. The construction as set forth in claim 1, wherein said lid and said end portion of sais line are disposed in the interior of a vehicle body frame having a closed cross section at a lower portion of a vehicle body.

13. A construction for an end portion of a line of a vehicle which opens to the atmosphere, comprising:
   a waterproofing member made of a resin including,
      a pipe member extending in a vertical direction and having an opened upper end portion;
      an inverted cup-like lid connected to the opened upper end portion of said pipe member through a hinge portion, covering the end portion of the pipe member, and having an opening that opens on a bottom side thereof,
   wherein an upper portion of the waterproofing member is disposed in the interior of a vehicle body frame having a closed cross section oat a lower portion of a vehicle body,
   wherein said vehicle body frame has an opening at its lower surface, and said pipe member has a flange and an elastically deformable locking projection between which a peripheral wall around the opening of the pipe member is clamped, to thereby detachably mount said waterproofing member on said vehicle body frame, and
   wherein the height of the opening of said lower than the height of said end portion of said pipe member.

14. The construction according to claim 13, wherein said opening of the vehicle body frame has a size through which said inverted cup-like lid can be passed.

* * * * *